US012774113B2

(12) United States Patent
Klose et al.

(10) Patent No.: US 12,774,113 B2
(45) Date of Patent: Oct. 27, 2026

(54) HYDRAULIC SYSTEM FOR AN AIRCRAFT, HYDRAULIC ARRANGEMENT, AIRCRAFT, AIRCRAFT ARRANGEMENT, AND METHOD FOR TESTING SUCH HYDRAULIC SYSTEM

(71) Applicant: Airbus Operations GmbH, Hamburg (DE)

(72) Inventors: Julian Klose, Hamburg (DE); Martin Hamm, Hamburg (DE); Rolf Gössing, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 72 days.

(21) Appl. No.: 18/958,817

(22) Filed: Nov. 25, 2024

(65) Prior Publication Data

US 2025/0171163 A1 May 29, 2025

(30) Foreign Application Priority Data

Nov. 23, 2023 (EP) .................................... 23211830

(51) Int. Cl.

| | |
|---|---|
| ***B64F 5/60*** | (2017.01) |
| ***B64C 13/36*** | (2006.01) |
| ***B64C 13/40*** | (2006.01) |
| ***B64C 25/22*** | (2006.01) |
| ***B64F 1/28*** | (2006.01) |
| ***F15B 1/26*** | (2006.01) |
| ***F15B 19/00*** | (2006.01) |
| ***F15B 21/00*** | (2006.01) |
| ***F15B 21/041*** | (2019.01) |
| ***F15B 21/044*** | (2019.01) |

(52) U.S. Cl.
CPC ................ *B64F 5/60* (2017.01); *B64C 13/40* (2013.01); *F15B 19/00* (2013.01); *F15B 21/005* (2013.01); *F15B 21/041* (2013.01); *F15B 21/044* (2013.01); *B64C 13/36* (2013.01); *B64C 25/22* (2013.01); *B64F 1/28* (2013.01); *F15B 1/26* (2013.01); *F15B 2211/70* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,538,682 | A | 11/1970 | Chattin et al. | |
| 4,735,380 | A | 4/1988 | Barousse et al. | |
| 6,688,402 | B1 * | 2/2004 | Wise | B64D 1/22 169/44 |
| 6,874,734 | B2 * | 4/2005 | Ramage | A62C 3/0228 169/53 |
| 10,195,471 | B2 * | 2/2019 | Doten | B01F 35/5311 |
| 11,365,004 | B1 * | 6/2022 | Celest | A62C 3/0228 |

(Continued)

OTHER PUBLICATIONS

Extended European Search Report for EP 23211830.7, dated May 7, 2024, 5 pages.

*Primary Examiner* — Binh Q Tran
(74) *Attorney, Agent, or Firm* — Nixon & Vanderhye P.C.

(57) ABSTRACT

A hydraulic system (14) in an aircraft (10) and configured to supply hydraulic power to one or more hydraulic components (16) in the aircraft (10) by means of an operating hydraulic fluid, the hydraulic system (14) including a system pumping device (26) for priming and pumping the operating hydraulic fluid from a system inlet (24) of the hydraulic system (14) and to the hydraulic components.

15 Claims, 2 Drawing Sheets

(56) References Cited

U.S. PATENT DOCUMENTS

| | | | | |
|---|---|---|---|---|
| 2018/0022441 | A1* | 1/2018 | Huynh | B64C 13/40 244/99.6 |
| 2020/0386249 | A1* | 12/2020 | Adamson | B64F 5/40 |
| 2021/0276695 | A1* | 9/2021 | Fox | F15B 15/06 |
| 2022/0169367 | A1* | 6/2022 | Pepper | F15B 20/004 |
| 2022/0228609 | A1* | 7/2022 | Krane | F15B 3/00 |

* cited by examiner

HYDRAULIC SYSTEM FOR AN AIRCRAFT, HYDRAULIC ARRANGEMENT, AIRCRAFT, AIRCRAFT ARRANGEMENT, AND METHOD FOR TESTING SUCH HYDRAULIC SYSTEM

RELATED APPLICATION

This application incorporates by reference and claims priority to European patent application 23211830.7, filed Nov. 23, 2023.

TECHNICAL FIELD

The invention relates to a hydraulic system for integrating in an aircraft. The invention further relates to a hydraulic arrangement, an aircraft, an aircraft arrangement, and a method for testing such a hydraulic system.

BACKGROUND

Conventional on-ground maintenance concepts for hydraulic systems rely on the usage of airfield-based ground support equipment, such as hydraulic ground carts. Procurement, logistics, and usage of these ground carts are significant for airfield operators. Maintenance personnel usually need to serve the ground cart and intervene during certain maintenance procedures. During common maintenance with ground carts, the hydraulic pump and its control may be replaced. Different procedures are available to manually perform further maintenance tasks. However, if the ground cart is not available at the aircraft location, delays may be the result.

SUMMARY

The invention may be embodied to provide an improved or alternative method for testing or maintaining a hydraulic system for an aircraft.

In one aspect, the invention provides a hydraulic system for integrating in an aircraft and for supplying hydraulic power to one or more hydraulic components of the aircraft by means of an operating fluid, the hydraulic system comprising a system pumping device for priming operating fluid from a system inlet of the hydraulic system and for pumping operating fluid thereinto.

The system pumping device may be configured for priming and pumping operating fluid at a variable pressure and/or flow rate inside the hydraulic system.

The hydraulic system may further comprise a controlling means for controlling the pressure and/or flow rate inside the hydraulic system by means of the system pumping device in a test mode.

The hydraulic system may further comprise a system deaeration device for releasing gas from inside the hydraulic system.

The hydraulic system may further comprise a fluid filtering device for filtering operating fluid inside the hydraulic system.

The hydraulic system may be configured for pumping operating fluid to a system outlet of the hydraulic system and for discarding operating fluid therefrom.

In another aspect, the invention may provide a hydraulic arrangement, comprising a hydraulic system according to any of the preceding embodiments and a hose for conducting operating fluid and for connecting to the system inlet and/or the system outlet of the hydraulic system.

The hose may include a hose pumping device for pumping operating fluid to the system pumping device when the hose is connected to the system inlet.

The hydraulic arrangement may further comprise a mobile reservoir for operating fluid, the hose being configured for fluidly connecting the mobile reservoir with the system inlet and/or the system outlet of the hydraulic system.

In another aspect, the invention may provide an aircraft, comprising an integrated hydraulic system according to any of the preceding embodiments.

In another aspect, the invention may provide an aircraft arrangement, comprising a hydraulic arrangement according to any of the preceding embodiments and the aircraft, the hydraulic system of the hydraulic arrangement being integrated in the aircraft.

In another aspect, the invention may provide a method for testing a hydraulic system integrated in an aircraft and for supplying hydraulic power to one or more hydraulic components of the aircraft by means of an operating fluid, the method comprising: providing a mobile reservoir containing operating fluid; fluidly connecting the mobile reservoir with a system inlet of the hydraulic system; and by the hydraulic system, priming operating fluid from the system inlet of the hydraulic system and pumping operating fluid thereinto.

Some aspects of embodiments of the invention may be summarized as follows:

The invention may be embodied to substitute hydraulic ground support equipment, such as hydraulic ground carts, on airfields, in the final assembly line (FAL), and/or in maintenance hangars. Preferred embodiments make use of an on-aircraft installed motor-pump unit and the respective control and monitoring. By this enhanced functionality of the aircraft hydraulic system, external means may not be needed and tasks are automated which may lead to a reduction of maintenance time and cost.

The invention may provide a hydraulic system, a hydraulic equipment, software including monitoring/control and maintenance strategies that are designed and/or adjusted to perform on-ground maintenance. Preferred embodiments may also include the ability to control the hydraulic motor-pump-unit similarly to a ground cart, but from the aircraft. The operation preferably goes beyond current functionalities, applying pre-defined settings for scheduled maintenance and allowing a fully independent control.

Embodiments of the invention may have the following advantages and effects:

By introducing this ground cart functionality into the on-board hydraulic system, one, several, or all of the following advantages may be achieved:

a. significant cost reduction for the airfield maintenance operator (less personnel, procurement, logistics);
b. more flexibility for on-ground maintenance (ground cart availability not needed, maintenance can be performed in outstation);
c. no common failure on different aircraft due to contaminated ground cart;
d. more flexibility in case of alternative hydraulic fluid (fluid is dedicated then to aircraft only and not to common maintenance points (like ground cart);
e. increase of ground-handling safety (taking advantage of all control and monitoring means installed on aircraft);
f. reduction of failure probability (due to autonomous maintenance procedures);

g. more flexibility in case of alternative maintenance procedure (usage of hydraulic pump allows all functionalities from the operational cycle of the aircraft); and/or h. no weight increase on aircraft: this may be advantageous for every operator, eliminating the need for hydraulic ground carts and therefore increasing the operability.

SUMMARY OF DRAWINGS

Embodiments of the invention are now explained in more detail with reference to the accompanying drawings of which

DETAILED DESCRIPTION

Figure 1:
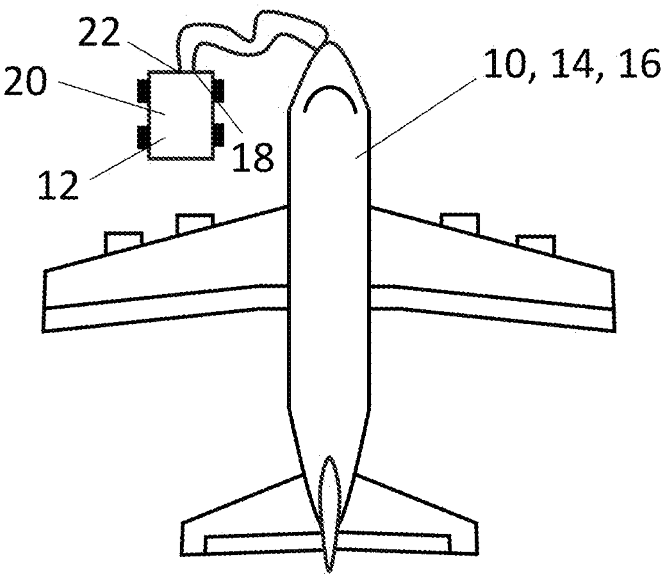
FIG. 1 shows an embodiment of an aircraft and a mobile hydraulic power unit, the aircraft including a first embodiment of an integrated hydraulic system.

FIG. 1 shows an embodiment of an aircraft 10 and a mobile hydraulic power unit 12 that is external to the aircraft 10. The mobile hydraulic power unit 12 may be a wheeled ground vehicle that is moved into position next to the aircraft to allow hydraulic hoses (lines) to connected the unit 12 to the aircraft 10.

The aircraft 10 includes a first embodiment of an integrated hydraulic system 14 that is configured for operating a plurality of hydraulic components 16 of the aircraft 10 by means of an operating or hydraulic fluid. The operating fluid may be a liquid such as water or oil. The hydraulic components 16 may be all of the components in the aircraft that are driven or powered by the operating fluid.

The hydraulic power unit 12 includes a unit inlet 18, a unit reservoir 20 for operating fluid, and a unit outlet 22. The unit inlet 18 and the unit outlet 22 are respectively fluidly connected with the integrated hydraulic system 14 of the aircraft 10.

The hydraulic power unit 12 is configured for supplying hydraulic power to the plurality of hydraulic components 16. For this, the hydraulic power unit 12 includes a unit pumping device for pumping operating fluid from the unit outlet 22 into the hydraulic system 14. Additionally, the hydraulic power unit 12 may be configured for priming or sucking in operating fluid from the hydraulic system 14 via the unit inlet 18.

Figure 2:
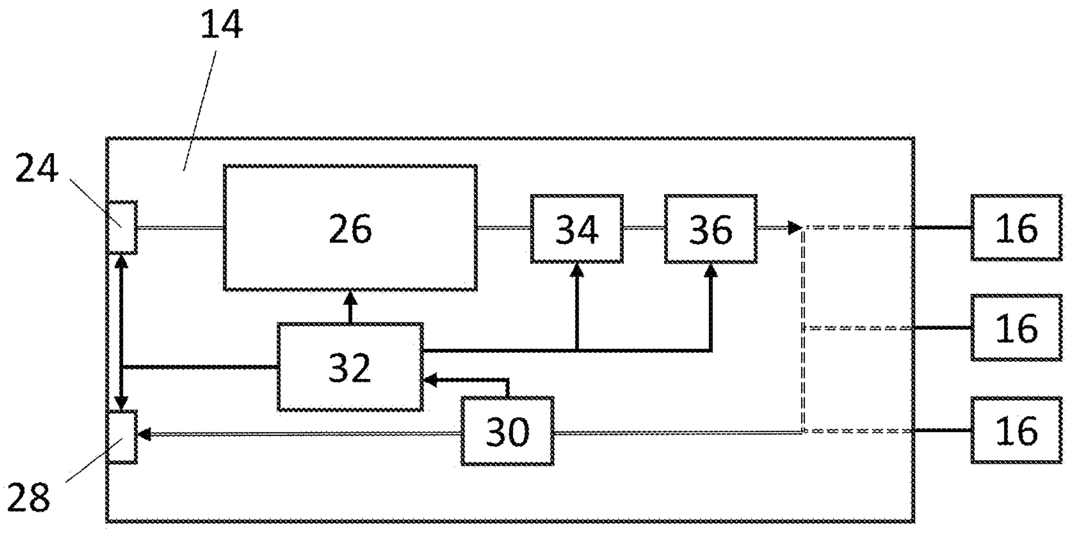
FIG. 2 schematically shows a second embodiment of the integrated hydraulic system.

FIG. 2 schematically shows a second embodiment of the hydraulic system 14 for integrating in the aircraft 10.

The hydraulic system 14 is configured for supplying hydraulic power to the plurality of hydraulic components 16 of the aircraft 10 by the operating fluid.

The hydraulic system 14 provides the operating fluid, e.g., a hydraulic liquid, to each of the hydraulic components.

The hydraulic system 14 includes a system inlet 24, a system pumping device 26, and a system outlet 28. The system pumping device 26 may be a pump configured to pump hydraulic liquid.

The system inlet 24 may include an opening and/or closing device for fluidly opening and/or closing the system inlet 24. Also, the system outlet 28 may include such opening and/or closing devices for opening and/or closing the system outlet 28.

The system pumping device 26 is configured for priming operating fluid from the system inlet 24 and for pumping operating fluid into the hydraulic system 14. Preferably, the system pumping device 26 is configured for priming and pumping operating fluid at variable pressure and/or flow rate inside the hydraulic system 14. Such pressure and/or flow rate may be in a range of 0 to 5000 psi (pounds per square inch) or 0 to 60 gpm (gallons per minute), respectively.

The hydraulic system 14 may further include a monitoring and/or sensing device 30 for monitoring and/or sensing the pressure and/or flow rate inside the hydraulic system 14.

The hydraulic system 14 may further include a system deaeration device 34. The system deaeration device 34 is configured for releasing gas or air from inside the hydraulic system 14. The system deaeration device 34 may, for example, include an air relief valve.

The hydraulic system 14 may further include a fluid filtering device 36. The fluid filtering device 36 is configured for filtering operating fluid inside the hydraulic system 14.

The hydraulic system 14 further includes a controlling system 32 for controlling the pressure and/or flow rate inside the hydraulic system 14 by the system pumping device 26. For this, the controlling system 32 may be controller with a data connection with the monitoring and/or sensing device 30.

The controlling system 32 may further be configured for controlling the opening and/or closing device of the system inlet 24 or the system outlet 28, respectively. The controlling system 32 may further be configured for controlling the system deaeration device 34. The controlling system 32 may further be configured for controlling and/or monitoring the fluid filtering device 36.

Figure 3:
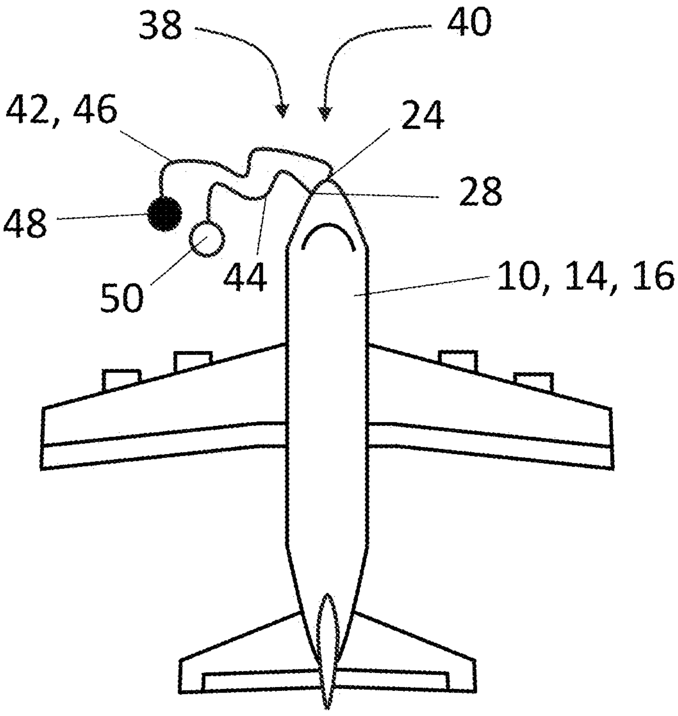
FIG. 3 shows an embodiment of an aircraft arrangement.

FIG. 3 shows an embodiment of an aircraft arrangement 38.

The aircraft arrangement 38 includes a hydraulic arrangement 40 and another embodiment of the aircraft 10. The hydraulic arrangement 40 may be ground based and positioned near the aircraft while the aircraft is stationary in an airport.

The hydraulic arrangement 40 includes the hydraulic system 14 according to the second embodiment as shown in FIG. 2. The hydraulic system 14 is integrated in the aircraft 10.

The hydraulic arrangement 40 further includes a first hose 42 and a second hose 44 respectively for conducting operating fluid. The first hose 42 is connected to the system inlet 24, while the second hose 44 is connected to the system outlet 28. The first hose 42 includes a hose pumping device 46 for pumping operating fluid from the hydraulic arrangement 40 to the system pumping device 26.

The hydraulic arrangement 40 further includes a first mobile reservoir 48 and a second mobile reservoir 50 respectively for operating fluid. The first mobile reservoir 48 and/or the second mobile reservoir 50 may respectively be configured as a barrel or any kind of other suitable container. The first mobile reservoir 48 contains a suitable amount of operating fluid, while the second mobile reservoir 50 provides a suitable volume for operating fluid. In other words, the first mobile reservoir 48 stores "fresh fluid", e.g., the liquid an operator wants to use for filling the aircraft hydraulic system 14. The second mobile reservoir 50 is meant to collect the fluid that is drained/removed from the aircraft hydraulic system 14. Typically, this is "used" fluid and the second mobile reservoir 50 prevents the fluid from being spilled into the environment. The first and second mobile reservoirs 48, 50 may be ground based and mounted on a mobile vehicle that is moved into position next to the aircraft.

The first hose 42 and the second hose 44 respectively fluidly connect the first mobile reservoir 48 and the second mobile reservoir 50 with the system inlet 24 and the system outlet 28.

For the aircraft arrangement 38, the controlling system 32 may control the pressure and/or flow rate inside the hydraulic system 14 in a test or maintenance mode. The test mode is configured for testing or maintaining the hydraulic system 14 and/or the hydraulic components 16 of the aircraft 10. The test mode is to be performed when the aircraft 10 is on the ground.

In the test mode, the controlling system 32 may initiate one or more test processes by means of the system pumping device 26. The test processes may include one, several, or all of the following:

- varying the pressure and/or the flow rate inside the hydraulic system 14;
- priming operating fluid from the system inlet 24;
- pumping operating fluid into the hydraulic system 14;
- pumping operating fluid to the system outlet 28;
- discarding operating fluid from the hydraulic system 14;
- opening and/or closing the system inlet 24 and/or the system outlet 28;
- de-airing the hydraulic system 14; and/or
- filtering operating fluid inside the hydraulic system 14.

One, several, or all of the test processes may be performed sequentially or simultaneously and/or automatically.

The priming operating fluid from the system inlet 24 is performed by conducting operating fluid from the first mobile reservoir 48 via the first hose 42 to the system inlet 24. It is performed by the hose pumping device 46 and the system pumping device 26. Additionally, it may be supported by gravity and/or the principle of communicating vessels. Alternatively, the hose pumping device 46 in the first hose 42 may be omitted and the system pumping device 26 may prime operating fluid from the first mobile reservoir 48 alone and/or supported by gravity and/or the principle of communicating vessels.

The discarding of operating fluid from hydraulic system 14 is performed by conducting operating fluid from the system outlet 28 via the second hose 44 to the second mobile reservoir 50. It may be performed only by gravity and/or the principle of communicating vessels. Additionally, the discarding of operating fluid from the hydraulic system 14 may be supported by means of the system pumping device 26.

The priming operating fluid and the discarding of operating fluid may be performed simultaneously and/or automatically. In this case, the operating fluid in the hydraulic system 14 may be exchanged. Also, the priming operating fluid and/or the discarding of operating fluid may be accompanied simultaneously and/or automatically with the de-airing of the hydraulic system 14 and/or the filtering of operating fluid inside the hydraulic system 14.

The invention may comprise embodiments of the aircraft arrangement 38 with a single hose 42, 44 and/or a single mobile reservoir 48, 50.

In a first case, operating fluid may be primed from the system inlet 24 by conducting operating fluid from the mobile reservoir 48, 50 via the first hose 42 to the system inlet 24. Simultaneously and/or automatically, operating fluid may be discarded from hydraulic system 14 by conducting operating fluid from the system outlet 28 via the second hose 44 to the mobile reservoir 48, 50. In this case, the operating fluid in the hydraulic system 14 may not be exchanged completely, but simultaneously and/or automatically filtered by the fluid filtering device 36.

In a second case, operating fluid may either be primed from the system inlet 42 for filling/topping up the hydraulic system 14 with operating fluid or operating fluid may be discarded from the hydraulic system 14 for draining operating fluid from the hydraulic system 14. The controlling system 32 may open and/or close the system inlet 24 and/or the system outlet 28 accordingly.

Embodiments of the invention may be summarized as follows:

For filling, draining, and/or changing hydraulic fluid, embodiments preferably use technology on aircraft in combination with hydraulic fluid containers. These both types of already existing infrastructure are combined so that dedicated hydraulic ground equipment can be substituted.

This can be achieved with enhanced hydraulic equipment foreseen on future aircraft applications, and a technical device that interconnects the hydraulic fluid container on ground directly with the hydraulic system on the aircraft.

The invention may be embodied to aim to tackle the problem, that the system pumping device 26 or the hydraulic pump in the aircraft 10 may not accept several meters of differential height (i.e., a sucking fluid height may be limited). Therefore, there are preferably two possible concepts according to embodiments of the invention:

According to a first concept, a separate, continuously operating pump in the hose arrangement 40 may be used for pre-pressurizing the suction hose 42.

According to a second concept (hose priming), a primer pump may be used for building up a pressure in the suction line until the system pumping device 26 has taken over the filling. The primer pump would only be needed for pre-pressurization for an initial starting condition; it may be simpler than the hose arrangement 40 according to the first concept.

Both concepts may be used alternatively or together according to preferred embodiments of the invention.

According to the second concept, a hose with an integrated pump is preferably used to push the hydraulic fluid from the container on ground to the hydraulic system pump so that it can then be sucked without the addition of air (hose priming) into the hydraulic system. A similar hose device can be taken for draining used hydraulic system fluid into a drain container. In this case, a dedicated pump would not be needed.

By using this hardware and applying the proposed operational modes, a controlled fluid filling, changing, topping up or drainage of the hydraulic system may be achieved preferably without support of a hydraulic ground cart.

The fluid filling of the hydraulic system may comprise the following steps:

- transport fluid container to aircraft;
- connect fluid container by means of a filling hose to hydraulic system at foreseen interfacing point;
- pump fluid from container to aircraft until fluid reaches hydraulic system pump (hose priming);
- take over filling action with aircraft internal hydraulic system pump (flow and pressure controlled): this may be done automatically by integrated aircraft hydraulic control means during a dedicated maintenance mode; and
- automatic air bleeding during fluid filling is foreseen by hydraulic system means (reservoir bleeding device).

The fluid changing in the hydraulic system may comprise the following steps:

- transport full and empty fluid container to aircraft;
- connect full fluid container by means of a filling hose to hydraulic system at foreseen interfacing point;

connect empty fluid container with hose at foreseen interfacing point;

pump fluid from container to aircraft until fluid reaches hydraulic system pump (hose priming);

take over filling action with aircraft internal hydraulic system pump (flow and pressure controlled): this may be done automatically by integrated aircraft hydraulic control means during a dedicated maintenance mode; and during the filling action used fluid will be discarded automatically into an empty container.

The topping-up of the hydraulic system may comprise the following step:

partial addition of fluid volume to achieve nominal reservoir level. Basically, the same or a similar procedure as fluid filling.

The draining of the hydraulic system may comprise the following steps:

transport empty fluid container to aircraft;

connect empty fluid container with hose at foreseen interfacing point;

open interfacing point and drain fluid by gravity;

alternatively, the internal aircraft hydraulic pump may actively support the draining.

Hydraulic System Deaeration:

In case of fluid filling, fluid changing, draining, and topping up, but also for other maintenance purposes, hydraulic deaeration may be needed.

A hydraulic deaeration may be performed by using a proper hydraulic fluid flow plus opening means in the hydraulic system that are able to relieve accumulated air to ambient.

To achieve this, preferred embodiments may use the capabilities of the proposed hydraulic system (controllable flow and pressure, air relief valve, enhanced control functions) by applying a dedicated maintenance mode so that filling, fluid changing, draining, topping up and possibly deaeration after invasive maintenance can be supported automatically.

The proposed hydraulic system can be operated by setting specific pressures and flows. Additionally, by applying the proposed procedures and making use of a fluid connecting device from a fluid container to the hydraulic system, the existing ground support equipment may be substituted. The different operational modes may be performed automatically using the hydraulic system inherent data/functionality and combining logics.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 aircraft
12 hydraulic power unit
14 integrated hydraulic system
16 hydraulic component
18 unit inlet
20 unit reservoir
22 unit outlet
24 system inlet
26 system pumping device
28 system outlet
30 monitoring and/or sensing device
32 controlling means
34 system deaeration device
36 fluid filtering device
38 aircraft arrangement
40 hydraulic arrangement
42 first hose
44 second hose
46 hose pumping device
48 first mobile reservoir
50 second mobile reservoir

The invention claimed is:

1. A hydraulic system configured to supply hydraulic power to one or more hydraulic components in an aircraft, the hydraulic system comprising:

a first mobile reservoir configured to store an operating fluid configured for providing the hydraulic power to the one or more hydraulic components, wherein the first mobile reservoir is external to and separate from the aircraft;

a hydraulic system on the aircraft including a system pumping device and in fluid communication with the one or more hydraulic components, wherein the system pumping device is configured to prime the operating fluid from a system inlet of the hydraulic system and to pump the operating fluid from the first mobile reservoir to the one or more hydraulic components within the aircraft, a second mobile reservoir configured to receive the operating fluid from the hydraulic system, wherein the second mobile reservoir is external to and separate from the aircraft, wherein the first mobile reservoir is fluidically coupled to the inlet to the hydraulic system, and wherein the second mobile reservoir is fluidically coupled the outlet of the hydraulic system and separate from the first mobile reservoir.

2. The hydraulic system according to claim 1, wherein the system pumping device is configured to prime the one or more hydraulic components and pump the operating fluid at a variable pressure and/or a variable flow rate in the hydraulic system.

3. The hydraulic system according to claim 2, further comprising a controlling system configured to control the pressure and/or the flow rate in the hydraulic system using the system pumping device to prime the at least one hydraulic component using the working fluid pumped from the first mobile reservoir.

4. The hydraulic system according to claim 1, further comprising a system deaeration device configured to release gas from the operating fluid in the hydraulic system.

5. The hydraulic system according to claim 1, further comprising a fluid filtering device configured to filter the operating fluid in the hydraulic system.

6. The hydraulic system according to claim 1, wherein the second mobile reservoir and the first mobile reservoir are both mounted on a ground mobile vehicle.

7. The hydraulic system according to claim 1, further comprising:

a first hose configured to conduct the operating fluid and is connected to the inlet of the hydraulic system and is connected to the first mobile reservoir, and a second hose configured to conduct the operating fluid and is connected to outlet of the hydraulic system and to an inlet to the second mobile reservoir.

8. The hydraulic arrangement according to claim 7, wherein the first hose includes a hose pumping device configured to pump the operating fluid to the system pumping device when the hose is connected to the system inlet.

9. An aircraft comprising the hydraulic system according to claim 1.

10. A method for testing a hydraulic system in an aircraft and configured to power to one or more hydraulic components in the aircraft by supplying the hydraulic components with an operating liquid, the method comprising:

providing a first mobile reservoir containing operating liquid, wherein the first mobile reservoir is external to and separate from the aircraft and stores the operating liquid;

connecting the first mobile reservoir to an inlet of the hydraulic system to allow the operating liquid to flow from the mobile reservoir to the hydraulic system;

connecting a second mobile reservoir to an outlet of the hydraulic system to allow the operating liquid to flow from the hydraulic system to the second mobile reservoir which is external to and separate from the aircraft and from the first mobile reservoir;

using the hydraulic system to pump the operating fluid from the first mobile reservoir to the aircraft, through the inlet and to the one or more hydraulic components;

priming the one or more hydraulic components with the operating fluid pumped from the first mobile reservoir, and pumping the operating fluid through the outlet of the hydraulic system to the second mobile reservoir.

11. A hydraulic system configured to supply and drain hydraulic operating liquid from hydraulically operated components within an aircraft, the hydraulic system including:

a first mobile reservoir configured to store an operating fluid configured for providing the hydraulic power to the one or more hydraulic components, wherein the mobile reservoir is external to and separate from the aircraft;

an inlet port within the aircraft configured to connect to an inlet hose coupled to the first mobile reservoir external to the aircraft;

a pump within the aircraft fluidically coupled to the inlet port and configured to pump the hydraulic operating liquid from the first mobile reservoir to the one or more hydraulically operated components to prime the one or more hydraulically operated components with the hydraulic operating liquid;

an outlet port within the aircraft fluidically coupled to the hydraulically operated components and configured to receive the hydraulic operating liquid from the hydraulically operated components, wherein the outlet port is configured to connect to an outlet hose which is connected to a second mobile reservoir of the hydraulic operating liquid external to the aircraft and separate from the first mobile reservoir, and a control system within the aircraft configured control the pump to adjust a pressure or flow rate of the hydraulic operating liquid flowing to the aircraft components.

12. The hydraulic system of claim 11 further comprising a deaerator device and filter arranged in series and fluidically connected to the pump and the hydraulically operated components.

13. The hydraulic system of claim 11, further comprising a sensor monitoring a pressure or a flow rate of the hydraulic operating liquid flowing from one or more of the hydraulically operated components to the outlet port, wherein the control system controls the pump to adjust the pressure or the flow rate of the hydraulically operating liquid flowing from the pump to the hydraulically operated components.

14. The hydraulic system of claim 11, wherein the hydraulically operated components are all of the hydraulically operated components in the aircraft.

15. The hydraulic system of claim 11, wherein the inlet port and the outlet port are configured for connection to the inlet hose and the outlet hose, respectively, which both extend from the aircraft to an on-ground mobile cart including the first mobile reservoir and the second mobile reservoir.

* * * * *